No. 710,541. Patented Oct. 7, 1902.
J. A. TITZEL, Sr.
ELECTRIC MOTOR OR GENERATOR.
(Application filed Dec. 13, 1900.)

(No Model.) 4 Sheets—Sheet 1.

WITNESSES:
Edw. Thorpe
John Lotta

INVENTOR
John A. Titzel, Sr.
By
ATTORNEYS

No. 710,541. Patented Oct. 7, 1902.
J. A. TITZEL, Sr.
ELECTRIC MOTOR OR GENERATOR.
(Application filed Dec. 13, 1900.)
(No Model.) 4 Sheets—Sheet 2.
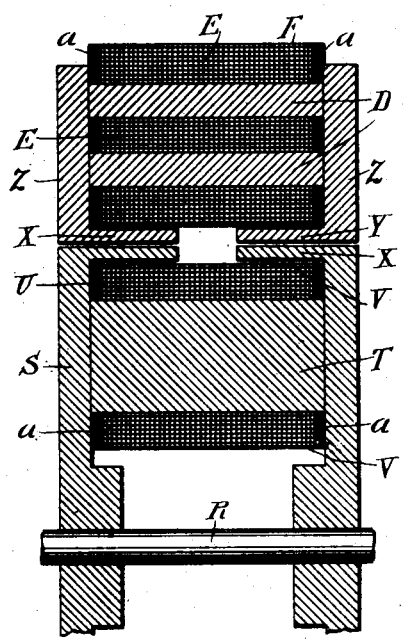
Fig. 2.ᵃ
WITNESSES:
Edward Thorpe
C. E. Holske
INVENTOR
John A. Titzel. Sr.
BY
ATTORNEYS No. 710,541. Patented Oct. 7, 1902.
J. A. TITZEL, Sr.
ELECTRIC MOTOR OR GENERATOR.
(Application filed Dec. 13, 1900.)

(No Model.) 4 Sheets—Sheet 3.

WITNESSES:
Edw. Thorpe
John Lotka

INVENTOR
John A. Titzel Sr.
By
ATTORNEYS

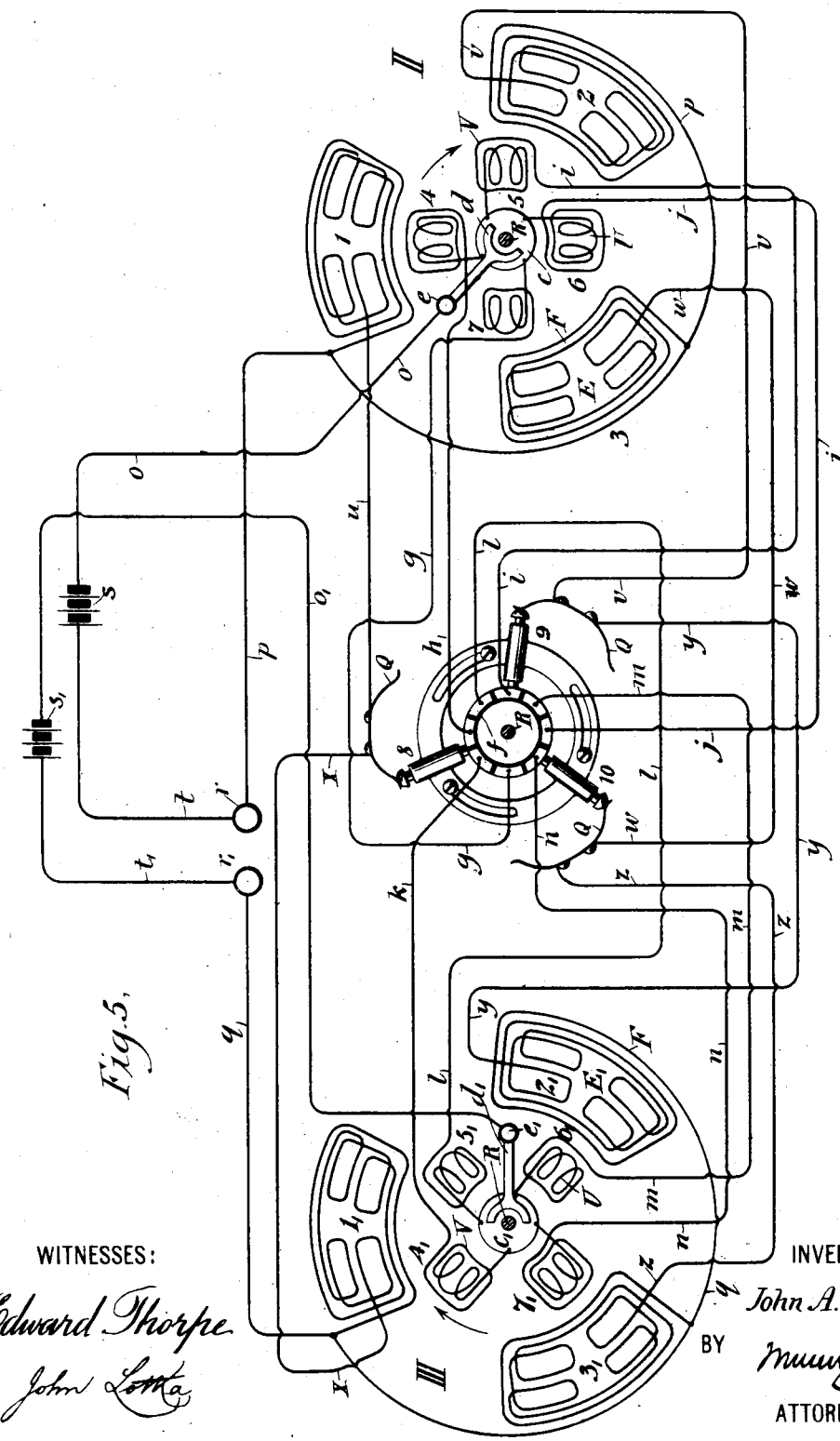

UNITED STATES PATENT OFFICE.

JOHN ANDREW TITZEL, SR., OF FRANKLIN, PENNSYLVANIA, ASSIGNOR OF ONE-THIRD TO JAMES C. TITZEL, OF GLENSHAW, PENNSYLVANIA.

ELECTRIC MOTOR OR GENERATOR.

SPECIFICATION forming part of Letters Patent No. 710,541, dated October 7, 1902.

Application filed December 13, 1900. Serial No. 39,628. (No model.)

*To all whom it may concern:*

Be it known that I, JOHN ANDREW TITZEL, Sr., a citizen of the United States, and a resident of Franklin, in the county of Venango and State of Pennsylvania, have invented new and useful Improvements in Electric Motors and Generators, of which the following is a full, clear, and exact description.

My invention relates to electric devices capable of use either as motors or as generators, and has for its object to provide a construction by which a strong and uniform magnetic field is obtained, so that the apparatus will be very efficient in either of its capacities.

The invention will be fully described hereinafter and the features of novelty pointed out in the appended claims.

Reference is to be had to the accompanying drawings, forming a part of this specification, in which similar characters of reference indicate corresponding parts in all the figures.

Figure 1:
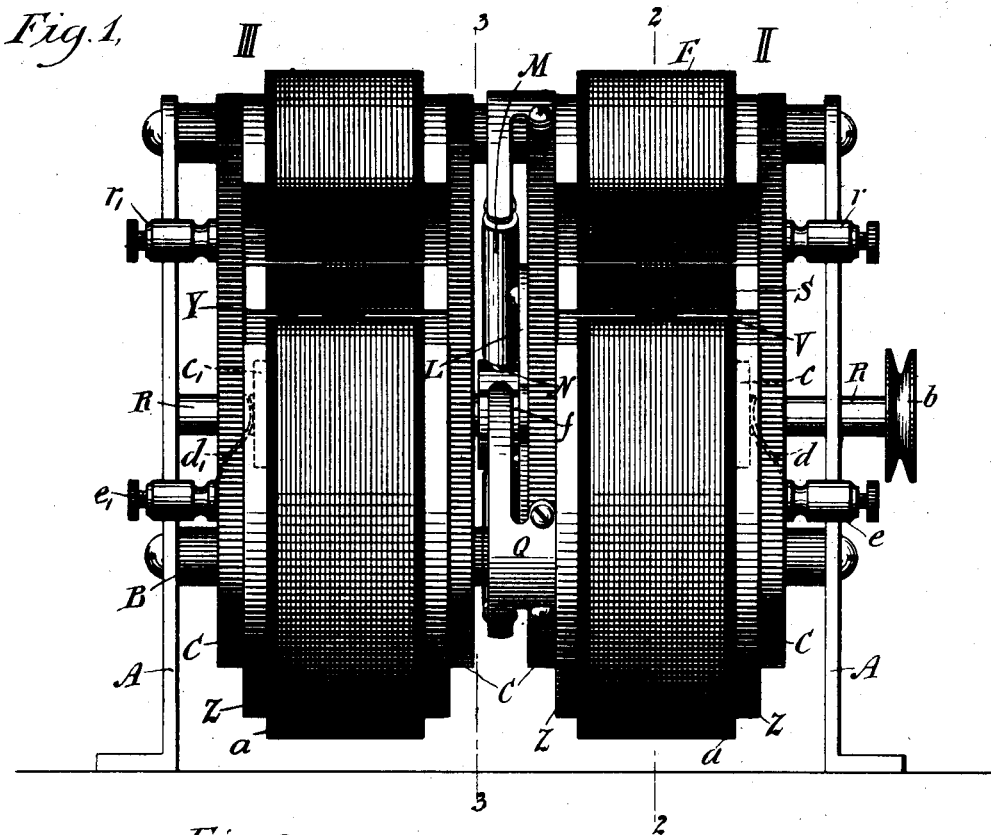
Figure 2:
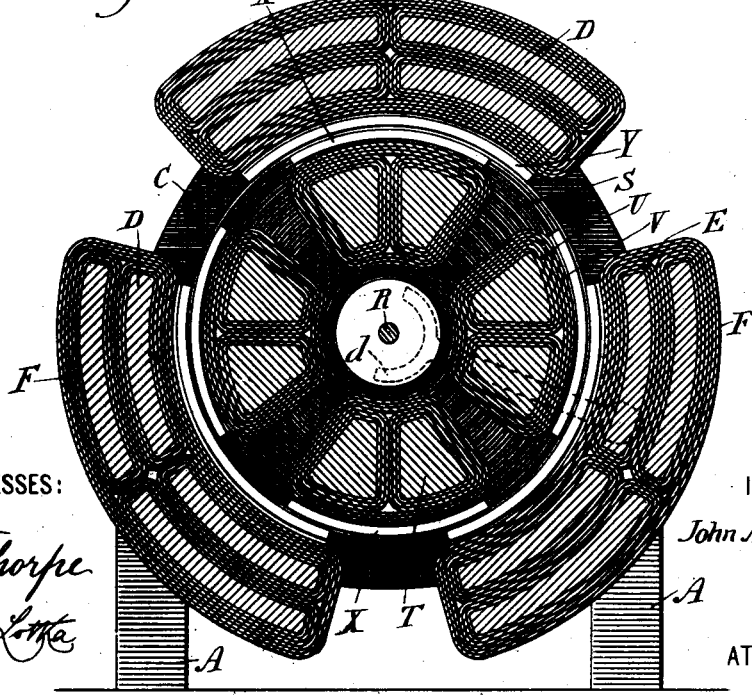
Figure 3:
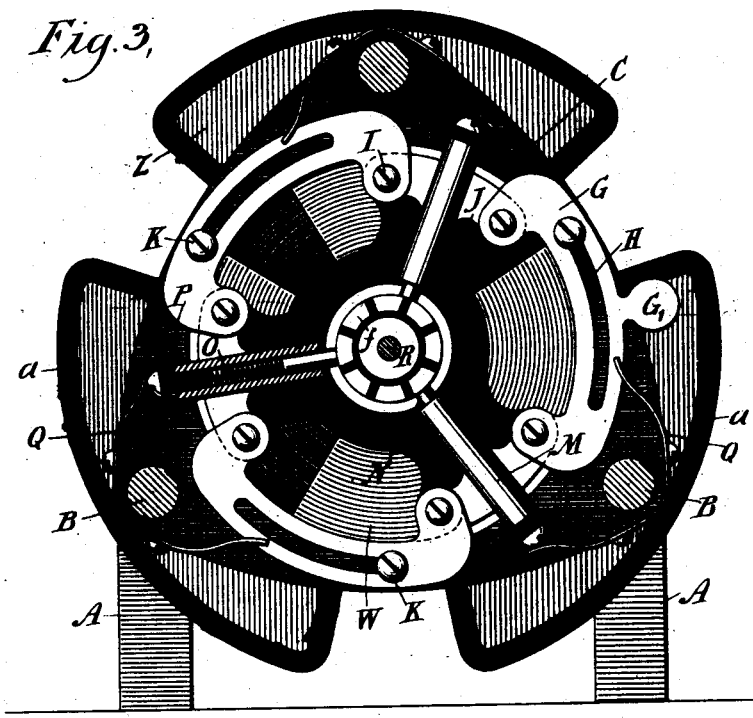
Figure 4:
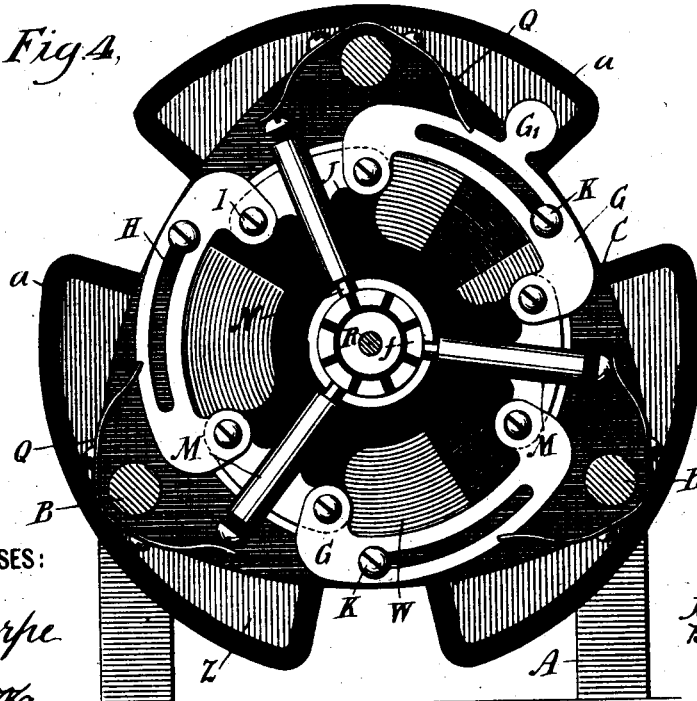

Figure 1 is a side elevation of a twin motor constructed according to my invention. Figs. 2 and 3 are sectional elevations thereof on lines 2 2 and 3 3, respectively, of Fig. 1. Fig. 2$^a$ is a sectional detail illustrating the sectional construction of the cores and coils. Fig. 4 is a view similar to Fig. 3, but with some parts in a different position to reverse the motor. Fig. 5 is a diagram illustrating the circuits of the twin motor.

The twin motor shown in Figs. 1 to 5 comprises a frame consisting of supports A, with cross members or stays B and four parallel plates C. Between each set of plates C are secured the field-magnets, of which there are three in the example shown, and each field-magnet has a core made of a plurality of individual cores D, each having its separate winding E, and an additional winding F surrounds the separate windings, and the five windings are so connected that the current in each of them will have a magnetizing effect of the same sign. For instance, the windings may be applied in the same direction and connected in series, as shown in Fig. 5. Between the two inner plates C is located the reversing device, comprising plates G, having slots H concentric with the field and with the armature, to be presently described.

The plates G are secured, as by pins or screws I, to a disk J, apertured at its center, so that it may clear the armature and the parts rotating therewith. The plates G and disk J are supported by pins or screws K, fastened to one of the inner frame-plates C and extending through the slots H. The length of these slots is such as to allow of a turning movement of the reversing device through an angle equal to one-half of that separating adjacent armature-magnets. Thus with four armature-magnets, as shown, the angle between adjacent armature-magnets will be ninety degrees, and consequently the slots H will have to be of a proper length to allow the plates G to turn through an angle of forty-five degrees. If there were five armature-magnets, the slots H would have to limit the movement of the plates G to thirty-six degrees. One of the plates G has a handle G' for turning the reversing device. The disk J has projections L, carrying rigidly sleeves M, in each of which is located a contact-pin N, pressed inward by a spring O, the outer end of the spring being engaged by a screw P, fitting into the sleeve M. There are as many of these sleeves and contact-pins as there are field-magnets, and the contact-pins are insulated from each other and are preferably so arranged with reference to the slots H that when the stop-screws K are at the ends of the said slots, as shown in Figs. 3 and 4, the contact-pins N will form, with the central lines of the field-magnets, an angle equal to one-fourth of the angle between adjacent field-magnets—that is, in the example shown the contact-pins N will in each of their extreme positions form an angle of twenty-two and one-half degrees with the central lines of the adjacent field-magnets. This, however, is not essential. To one of the plates C are attached three spring contact-arms Q, each contact-arm having two members, one or the other of which engages the corresponding screw P, according to the position of the reversing device. The plates C are preferably made of insulating material, or at least the contact-arms Q are insulated from each other.

In the supports A is journaled the armature-shaft R, and upon this shaft are fastened on each side two disks or plates S, between which are arranged the armature-magnets, the number of which is greater than that of the field-magnets. Thus in the example shown each armature has four magnets. Each of these magnets preferably has a plurality of cores T, (two, as shown,) having individual windings U and an exterior common coil V, these coils being connected to have a like magnetizing effect, as explained with reference to the field-magnets. A very strong magnetic effect is obtained by this construction. The cores T are connected with pole-pieces W, located on the outside of the plates S and extending outwardly, the outer ends of the pole-pieces being extended laterally over the plates S and over the coils V, forming shoes, as indicated at X. These shoes are arranged to rotate close to similar shoes Y, extending from pole-pieces Z of the field-magnets. These pole-pieces Z are secured to the cores D. Insulating-heads $a$ are preferably employed for each of the field-magnets.

The armature-shaft R carries a pulley $b$ for receiving or transmitting power and, further, carries on each side a collector-ring $c\ c'$, engaged by a stationary contact-arm $d\ d'$, connected with the binding-posts $e\ e'$, respectively. On the armature-shaft is further mounted rigidly a commutator having conducting-sections $f$, separated or insulated from each other and adapted to be engaged by the inner ends of the contact-pins N. There are twice as many of these sections $f$ as there are armature-magnets—that is, eight in the case shown. Of these sections alternate ones are connected by wires $g\ h\ i\ j$ with one end of each armature-magnet coil of one armature, and the intervening sections $f$ are connected by wires $k\ l\ m\ n$ with the magnet-coils of the other armature in the manner indicated in Fig. 5. The other ends of the armature-coils are connected with the collectors $c\ c'$, respectively, and through their medium and the arms $d\ d'$ with the binding-posts $e\ e'$. The latter are connected by wires $o\ o'$, respectively, with one pole of sources of electricity, such as batteries $s\ s'$, respectively. Each of the compound field-magnet coils has one of its ends connected, as by wires $p$ and $q$, with binding-posts $r$ and $r'$, respectively. $t$ and $t'$ are main wires leading from the other poles of the batteries $s\ s'$ to the binding-posts $r\ r'$, respectively. The opposite ends of the field-magnet coils are connected in rotation with the contact-arms Q, each arm being connected with one field-magnet coil of each armature, the connection being effected by wires $u\ v\ w\ x\ y\ z$, respectively.

The two halves of the motor are constructed alike, but have a different relative arrangement of armature and field magnets, so that the periods of greatest magnetic attraction will be different for the two halves or sections. The interval between the periods of greatest attraction should correspond to an angle equal to one-half of that formed between two armature-magnets. Thus with four armature-magnets the said interval should correspond to a rotation through an angle of forty-five degrees. To secure this result, if the field-magnets of the two motor-halves are in longitudinal or axial alinement, as shown, corresponding armature-coils of the two armatures should stand in planes at forty-five degrees to each other, as indicated in Fig. 5. Of course the reverse arrangement would yield the same result. The two sections of the motor are designated as II and III, respectively.

The operation is as follows: In the position shown in Fig. 5 the motor, if supplied with an electric current from the batteries $s$ and $s'$, will rotate clockwise, as indicated by the arrows. To facilitate an explanation of the circuits, the magnet-coils and contact-pins have been numbered. The lowermost contact-pin 9 engages that section $f$ which is connected with the wire $i$, and a portion of the current therefore passes through the following circuit: battery $s$, wire $o$, binding-post $e$, arm $d$, collector $c$, armature-coil 5 of motor-section II, wire $i$, commutator-section $f$, contact-pin 9, contact-arm Q, wire $v$ to the corresponding field-magnet coil 2 of the motor-section II and thence to the other terminal of battery $s$ by way of the wires $p$ and $t$. The coils 2 and 5 will therefore be energized and attract each other, exerting a torque to turn the shaft R clockwise. The contact-pin 10 closes the following circuit: battery $s'$, wire $o'$, binding-post $e'$, arm $d'$, collector $c'$, armature-coil 7', wire $n$, commutator-section $f$, contact-pin 10, contact-arm Q, wire $z$, field-coil 3', wire $q$, binding-post $r'$, and wire $t'$ back to the battery $s'$. The coils 3' and 7' therefore attract each other and turn the shaft R clockwise. The upper contact-pin 8 is just about to break the circuit through the commutator or section $f$, connected with the wire $h$, which circuit is as follows: battery $s$, wire $o$, binding-post $e$, arm $d$, collector $c$, armature-coil 4, wire $h$, commutator-section $f$, contact-pin 8, arm Q, wire $u$, field-coil 1, wire $p$, binding-post $r$, wire $t$, and battery $s$. The armature-coil 4 is therefore attracted by the field-coil 1 until the two coils are in radial alinement, as in Fig. 5, at which moment the circuit is broken. At the same time the contact-pin 8 closes another circuit, as follows: battery $s'$, wire $o'$, binding-post $e'$, arm $d'$, collector $c'$, armature-coil 4', wire $k$, commutator-section $f$, contact-pin 8, contact-arm Q, wire $x$, field-coil 1', wire $q$, binding-post $r'$, wire $t'$, and battery $s'$. It will be noticed that at the time the current begins to flow through the circuit the coil 4' is at an angle of forty-five degrees to the field-coil 1'—that is, the current is supplied to each armature-coil and to the corresponding field-coil during a revolution of forty-five degrees, or, generically speaking, during a revolution through one-half of the angle between the adjacent armature-coils. It will be further observed that (apart from the moment when a contact-pin engages two adjacent commutator-sections $f$) there is always in action one armature-coil of one motor-section and two armature-coils of the other section. The periods of these coils, however, vary. Thus in Fig. 5 the coil 4 is at the end of its propelling or active movement, which, as above stated, extends through an angle of forty-five degrees. The coil 4' is at the beginning of such movement—that is, it has to turn forty-five degrees before it will be cut out of the circuit. The coil 5 is at one-third of its active movement—that is, it has already turned through an angle of fifteen degrees while receiving current and will still turn through an angle of thirty degrees before the current will be cut off. The coil 7' is at two-thirds of its active movement—that is, it has turned through an angle of thirty degrees in an energized condition and has still to turn through an angle of fifteen degrees to complete its active stroke. As the attractive force increases gradually from the position shown for the armature-coil 4' to that shown for the armature-coil 4, it follows not only that the motor has no dead-center, but that the torque—that is, the sum of the individual attractive actions of the several coils—is practically constant or at least is more evenly distributed than if the action of all coils began and ended at the same time. As the armature rotates its coils are energized successively as soon as each of them reaches a point forty-five degrees from one of the field-coils, and the circuit is broken every time an armature-coil comes exactly opposite one of the field-coils. It will be seen that one commutator and one set of contact-pins N, with their contact-arms Q, is sufficient for both sections of the twin motor. To cause the motor to turn in the opposite direction—that is, contra-clockwise—the reversing device is brought from the position shown in Figs. 4 and 5 to that shown in Fig. 3. This may be done while the motor is running. The contact-pins N are thus connected with the other members of the contact-arms Q and move through an angle of forty-five degrees. This reverses the motor. For instance, if the reversing device is thrown from left to right while in the position shown in Fig. 5 the contact-pin 9 will pass from the commutator-section connected with the wire $i$ to that connected with the wire $m$, thus energizing the armature-coil 6' instead of the armature-coil 5 and causing the field-coil 2' to turn the armature-coil 6' contraclockwise. Similarly the contact-pin 8 will be shifted to the junction of the commutator-sections connected with the wires $h$ and $l$, respectively, so that there will be a magnetic attraction between the coils 1 and 4 of the motor-section II (for a moment only) and between the coils 1' and 5' of the motor-section III. Finally, the contact-pin 10 will pass from the commutator-section connected with the wire $n$ to that connected with the wire $g$, energizing the coils 3 and 7. The result, as will be obvious, is a reversal or a contraclockwise rotation of the armature-shaft R. The relative periods of magnetization will be exactly the same as described with reference to the clockwise rotation.

It will be obvious that the motor will operate even if one of its sections is thrown out of action, as by disconnecting the battery $s$ or $s'$ from its circuit. In this case the other section will drive the shaft R alone. The reversing device will operate in the same manner, and there will be no dead-centers, since, as above explained, in any position of the motor there is at least one armature-coil energized in one section, and when one coil is in the dead-center position another coil of the same section which is not in the dead-center position is energized. As either half or section of the motor is operative by itself, it follows that a simple reversible motor may be constructed by the omission of, say, the section III, with its battery $s'$ and wires $x\,y\,z$ and $k\,l\,m\,n$. In this case alternate commutator-sections $f$ would therefore remain unconnected. The twin motor, however, possesses the advantages of a much more regular and powerful action, and, moreover, can be operated with more or less power by operating both motor-sections or only one of them.

Having thus described my invention, I claim as new and desire to secure by Letters Patent—

1. An electric motor or generator, having stationary or field magnets, and rotary or armature magnets, each magnet comprising a plurality of cores, and coils consisting of an individual winding for each core, and an outer winding for all the cores, connections whereby a current flowing through said windings will have a like magnetizing effect on all the cores of the magnet, a commutator and brushes controlling the connection of the armature-coils with the field-coils, and connections for supplying current to the motor.

2. An electric motor or generator, having rotary armature-magnets arranged to move in unison, and stationary or field magnets surrounding the space within which the armature rotates, the axes of the magnets' cores being parallel with the armature's axis of rotation, pole-pieces projected radially from each end of each core toward the magnets of the other set, shoes projected inwardly, in a direction parallel with the armature's axis, from the free ends of said pole-pieces, the shoes of the armature-magnets being arranged to rotate within the space surrounded by the shoes of the field-magnets, and means for controlling the supply of current to the field-magnets and armature-magnets.

3. An electric motor or generator, comprising an armature, a group of field-magnets, and means for supplying a current to said armature and said field-magnets, each of said field-magnets comprising a plurality of cores, each of which is wound with an individual coil, and the several cores thus wound being further wound with a general coil surrounding said plurality of cores.

4. An electric motor or generator, comprising stationary and revoluble parts provided with magnets, and means for supplying a current to said magnets, each of said magnets comprising a plurality of cores all wound with a general coil of wire, and each of said cores being separately wound with an individual coil of wire, all of said windings for each magnet being in the same direction.

5. An electric motor or generator, comprising field-magnets and a revoluble armature, the said field-magnets being built up of sector-shaped cores concentric to said armature, each of said cores being provided with coils wound in the same direction, a plurality of said cores thus wound being surrounded by a common coil wound in the same direction as the individual cores thereof, and means for energizing said field and said armature.

6. An electric motor or generator, comprising a stationary field and a revoluble armature, said armature comprising a plurality of sector-shaped cores provided with separate coils all wound in the same direction, a plurality of said cores thus wound being grouped together in the form of a sector, said sector being provided with a coil wound in the same direction as the individual cores thereof, and means for energizing said field and said armature.

7. An electric motor or generator, comprising a field provided with sector-shaped magnets and a revoluble armature likewise provided with sector-shaped magnets, all of said magnets being concentric with the axis of said armature and each of said magnets being built up of a plurality of sector-shaped cores, each core being wound with an individual coil, the several coils being wound in the same direction and provided outside of the individual windings with a larger winding common to all of the cores, and means for energizing all of said magnets.

In testimony whereof I have signed my name to this specification in the presence of two subscribing witnesses.

JOHN ANDREW TITZEL, Sr.

Witnesses:
J. C. TITZEL,
J. H. BECKFIELD.